(12) United States Patent
Baba et al.

(10) Patent No.: US 9,350,203 B2
(45) Date of Patent: May 24, 2016

(54) RARE EARTH SINTERED MAGNET, METHOD FOR PRODUCING THE SAME, MOTOR, AND AUTOMOBILE

(75) Inventors: Fumitaka Baba, Tokyo (JP); Satoshi Tanaka, Tokyo (JP); Makoto Iwasaki, Tokyo (JP); Chikara Ishizaka, Tokyo (JP)

(73) Assignee: TDK Corporation, Tokyo (JP)

( * ) Notice: Subject to any disclaimer, the term of this patent is extended or adjusted under 35 U.S.C. 154(b) by 749 days.

(21) Appl. No.: 13/637,247

(22) PCT Filed: Mar. 30, 2011

(86) PCT No.: PCT/JP2011/058046
§ 371 (c)(1),
(2), (4) Date: Oct. 19, 2012

(87) PCT Pub. No.: WO2011/122667
PCT Pub. Date: Oct. 6, 2011

(65) Prior Publication Data
US 2013/0026870 A1    Jan. 31, 2013

(30) Foreign Application Priority Data

Mar. 30, 2010    (JP) .................................. 2010-078699

(51) Int. Cl.
*H01F 7/02* (2006.01)
*H02K 1/02* (2006.01)
*C22C 38/00* (2006.01)
(Continued)

(52) U.S. Cl.
CPC ................ *H02K 1/02* (2013.01); *C22C 38/005* (2013.01); *C22C 38/14* (2013.01); *H01F 1/0577* (2013.01); *H01F 41/0293* (2013.01); *H02K 21/16* (2013.01)

(58) Field of Classification Search
CPC ..... C22C 38/005; C22C 38/14; H01F 1/0293; H01F 1/0577; H01F 41/0293; H02K 1/02; H02K 21/16
See application file for complete search history.

(56) References Cited

U.S. PATENT DOCUMENTS

| 7,199,690 B2 | 4/2007 | Hidaka et al. |
| 7,488,393 B2 | 2/2009 | Nakamura et al. |

(Continued)

FOREIGN PATENT DOCUMENTS

| CN | 1540686 | 10/2004 |
| CN | 101542654 | 9/2009 |

(Continued)

OTHER PUBLICATIONS

Gabay, A. M., Y. Zhang, and G. C. Hadjipanayis. "Effect of very small additions on the coercivity of Dy-free Nd—Fe—(Co)—B-sintered magnets." Journal of Magnetism and Magnetic Materials 238.2 (2002): 226-232.*

*Primary Examiner* — Jessee Roe
(74) *Attorney, Agent, or Firm* — Drinker Biddle & Reath LLP (57) ABSTRACT

Provided is a rare earth sintered magnet 10 comprising a group of main phase grains 2 each composed of an R-T-B-based rare earth magnet comprising a core 4 and a shell 6 covering the core 4, wherein a thickness of the shell 6 is 500 nm or less, R includes a light rare earth element and a heavy rare earth element, and a Zr compound 8 is present in a grain boundary phase 7 of the group of main phase grains 2 and/or the shell 6. Also provided are a motor comprising the rare earth sintered magnet 10 and an automobile comprising the motor.

10 Claims, 5 Drawing Sheets

(51) Int. Cl.
*C22C 38/14* (2006.01)
*H01F 1/057* (2006.01)
*H01F 41/02* (2006.01)
*H02K 21/16* (2006.01)

(56) References Cited

U.S. PATENT DOCUMENTS

| 8,206,516 | B2 | 6/2012 | Yoshimura et al. |
| 2006/0137767 | A1* | 6/2006 | Yamamoto et al. ........... 148/302 |
| 2010/0129538 | A1 | 5/2010 | Kunieda et al. |

FOREIGN PATENT DOCUMENTS

| EP | 1 860 668 | 11/2007 | |
| EP | 2 071 597 | 6/2009 | |
| JP | 2006-100847 | 4/2006 | |
| JP | 2006-303433 | 11/2006 | |
| JP | 2007-273815 | * 10/2007 | .............. H01F 41/02 |
| JP | 2007-288021 | 11/2007 | |
| JP | 2007-305878 | 11/2007 | |
| JP | 2009-124150 | 6/2009 | |
| JP | 2009-302119 | 12/2009 | |
| WO | 2004/029996 | 4/2004 | |
| WO | 2005/001856 | 1/2005 | |
| WO | 2006/098204 | 9/2006 | |
| WO | 2007/088718 | 8/2007 | |
| WO | 2008/120784 | 10/2008 | |
| WO | 2009/004794 | 1/2009 | |
| WO | 2009/004994 | 1/2009 | |
| WO | 2009/016815 | 2/2009 | |
| WO | 2009/057592 | 5/2009 | |

* cited by examiner

RARE EARTH SINTERED MAGNET, METHOD FOR PRODUCING THE SAME, MOTOR, AND AUTOMOBILE

TECHNICAL FIELD

The present invention relates to a rare earth sintered magnet, a method for producing the same, a motor, and an automobile.

BACKGROUND ART

Rare earth sintered magnets having an R-T-B-based (R is a rare earth element and T is a metal element such as Fe) composition are magnets having excellent magnetic properties, and various studies have been made aiming at further improvement in the magnetic properties (for example, Patent Literature 1). As a measure of the magnetic properties of magnets, residual magnetic flux density (Br) and coercive force (HcJ) are generally used, and it can be said that a magnet which is high in these values in a balanced manner has excellent magnetic properties.

CITATION LIST

Patent Literature

Patent Literature 1: International Publication Pamphlet No. WO2009/4994

SUMMARY OF INVENTION

Technical Problem

Recently, the rare earth magnets have been used for various purposes, and there have increasingly been cases where higher magnetic properties than those of conventional techniques are demanded. Under such a circumstance, it is extremely advantageous from an industrial viewpoint if the magnetic properties such as Br and HcJ can be improved to any extent.

Then, the present invention was made in view of the above circumstance and an object of the present invention is to provide a rare earth magnet having excellent Br and excellent HcJ, and a motor and an automobile using the same.

Solution to Problem

Aimed at achieving the above object, the rare earth sintered magnet of the present invention comprises a group of main phase grains each composed of an R-T-B-based rare earth magnet comprising a core and a shell covering the core, wherein a thickness of the shell is 500 nm or less, R includes a light rare earth element and a heavy rare earth element, and a Zr compound is present in a grain boundary phase of the group of main phase grains and/or the shell. It is noted that the group of main phase grains means a plurality of main phase grains. Moreover, a portion in which a ratio of a heavy rare earth element to a light rare earth element (heavy rare earth element/light rare earth element) is twice or more as large as that in a center portion of the main phase grain (core) is defined as a shell.

The rare earth sintered magnet of the present invention can balance Br and HcJ in a higher level in comparison with the conventional techniques.

It is preferred that a Ga compound is further present in the grain boundary phase of the group of main phase grains. By this, it is possible to further improve the magnetic properties of the magnet.

It is preferred that a content of an oxygen element is 2500 ppm or less and a content of a carbon element is 500 ppm or more and 1500 ppm or less in the rare earth sintered magnet. By this, it is possible to further improve the magnetic properties of the magnet.

It is preferred that a content of a B element is 0.85 mass % or more and 0.98 mass % or less in the rare earth sintered magnet. By this, it is possible to further improve the magnetic properties of the magnet.

It is preferred that a total content of the rare earth element (R) is 29.0 mass % or more and 33.0 mass % or less in the rare earth sintered magnet. By this, it is possible to further improve the magnetic properties of the magnet.

It is preferred that a content of a Zr element is 0.05 mass % or more and 0.5 mass % or less in the rare earth sintered magnet. By this, it is possible to further improve the residual magnetic flux density and the coercive force.

A motor of the present invention comprises the aforementioned rare earth sintered magnet of the present invention.

When a volume and a shape of the rare earth sintered magnet of the present invention are the same as those of the conventional R-T-B-based rare earth sintered magnets, the number of magnetic flux of the rare earth sintered magnet of the present invention is higher than that of the conventional magnets since the residual magnetic flux density of the rare earth sintered magnet of the present invention is high. Therefore, by the motor comprising the rare earth sintered magnet of the present invention, energy conversion efficiency is improved in comparison with the conventional techniques.

Even when the volume of the rare earth sintered magnet of the present invention is smaller than that of the conventional R-T-B-based rare earth sintered magnets, the rare earth sintered magnet of the present invention, which has high residual magnetic flux density, has a comparable number of magnetic flux with that of the conventional magnets. That is, the rare earth sintered magnet of the present invention can be downsized without reducing the number of magnetic flux in comparison with the conventional magnets. As a result, the present invention enables downsizing and weight saving of the motor because also a yoke volume and an amount of windings are reduced with downsizing of the rare earth sintered magnet.

An automobile of the present invention comprises the aforementioned motor of the present invention. That is, the automobile of the present invention is driven by the motor of the present invention. It is noted that, in the present invention, the automobile means, for example, an electric automobile, a hybrid automobile, or a fuel cell automobile driven by the motor of the present invention.

Since the automobile of the present invention is driven by the motor of the present invention having higher energy conversion efficiency in comparison with the conventional techniques, the fuel cost thereof is improved. Moreover, in the case of the automobile of the present invention, downsizing and weight saving of the automobile itself can be achieved because downsizing and weight saving of the motor can be achieved as described above. As a result, the fuel cost of the automobile can be improved.

A method for producing a rare earth sintered magnet of the present invention comprises a first step of allowing a slurry containing a heavy rare earth compound containing a heavy rare earth element, a binder, and a solvent to adhere to a sintered compact of an R-T-B-based rare earth magnet containing Zr, and a second step of heat treating the sintered compact with the slurry adhering thereto.

By the aforementioned producing method of the present invention, it is possible to produce a rare earth sintered magnet having excellent Br and excellent HcJ.

Advantageous Effects of Invention

According to the present invention, it is possible to provide a rare earth sintered magnet having excellent Br and excellent HcJ, a motor and an automobile using the same.

BRIEF DESCRIPTION OF DRAWINGS

FIGS. 5 (a) and (b) are diagrams illustrating results of line analyses of a base material and a rare earth sintered magnet using an STEM-EDS, respectively.

DESCRIPTION OF EMBODIMENTS

Hereinafter, a detailed description will be given of a preferred embodiment of the present invention with reference to drawings.

(Rare Earth Sintered Magnet)

Figure 1:
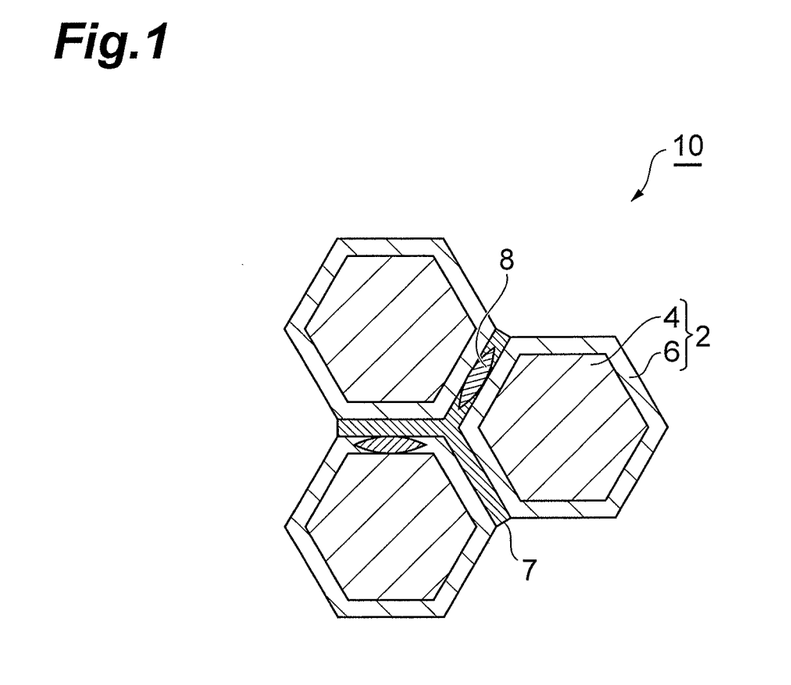
FIG. 1 is a schematic cross sectional view of a rare earth sintered magnet according to one embodiment of the present invention.

FIG. 1 is a schematic cross sectional view of a rare earth sintered magnet according to one embodiment of the present invention obtained based on a result of an analysis of a rare earth sintered magnet (hereinafter, also referred to just as "magnet") produced in Example by using an energy dispersive X-ray spectroscope provided in a scanning transmission electron microscope (STEM-EDS).

A rare earth sintered magnet 10 comprises a plurality of main phase grains 2 and a grain boundary phase 7 present in a grain boundary of the group of the main phase grains 2. The main phase grain 2 comprises a core 4 and a shell 6 covering the core 4. Moreover, a Zr compound 8 is present in the grain boundary phase 7 and/or the shell 6.

The main phase grain 2 is composed of an R-T-B-based rare earth magnet (for example, $R_2T_{14}B$). The rare earth element R contains a light rare earth element and a heavy rare earth element. The light rare earth element may be at least one selected from the group consisting of La, Ce, Pr, Nd, Pm, Sm, and Eu. The heavy rare earth element may be at least one selected from the group consisting of Gd, Tb, Dy, Ho, Er, Tm, Yb, and Lu. The metal element T contains Fe and Co.

In this embodiment, a portion in which a ratio of the heavy rare earth element to the light rare earth element (heavy rare earth element/light rare earth element) is twice or more as large as that in a center portion of the main phase grain (core) is defined as a shell.

A thickness of the shell 6 is 500 nm or less, more preferably 300 nm or less. Moreover, a grain diameter of the main phase grain 2 (crystal grain) is preferably 3.0 to 6.5 μm.

For the purpose of improving the coercive force of the R-T-B-based rare earth magnet, generally, a heavy rare earth element such as Dy and Tb may be added to the R-T-B-based rare earth magnet as R. By the addition of the heavy rare earth element, an anisotropic magnetic field becomes strong and a nucleus of magnetization reversal becomes hard to be formed, which leads to higher coercive force. However, when an added amount of the heavy rare earth element is too large, saturation magnetization (saturation magnetic flux density) of the R-T-B-based rare earth magnet becomes small, and then, also the residual magnetic flux density becomes small. Therefore, for the R-T-B-based rare earth magnet, in order to balance the residual magnetic flux density and the coercive force, a structure comprising a core mainly contributing to the residual magnetic flux density properties and a shell contributing to the coercive force is advantageous.

The Zr compound 8 only has to be a compound containing Zr, and specific examples thereof include a Nd—Zr—Cu compound and a Zr—B compound. It is noted that the Zr compound may be present in the shell. It is believed that, in the rare earth sintered magnet of this embodiment, diffusion of the heavy rare earth element into the main phase grain is suppressed because the Zr compound 8 is present in the grain boundary phase 7 and/or the shell 6, which contributes to improvements in the residual magnetic flux density and the coercive force. That is, Br is not decreased because diffusion of the heavy rare earth element into the core 4 is suppressed, and high coercive force is achieved because the heavy rare earth element is concentrated in the shell 6. A content of Zr in the rare earth sintered magnet is preferably 0.05 mass % or more and 0.5 mass % or less, more preferably 0.08 mass % or more and 0.2 mass % or less.

It is confirmed that the Zr compound 8 is present in the grain boundary phase 7 by observation of Zr precipitates at around the grain boundary using a STEM-EDS.

A content of an oxygen element in a sintered compact is preferably 3000 ppm by mass or less, more preferably 1000 ppm or less. When the content of oxygen is smaller, amounts of impurities in the obtained sintered magnet becomes smaller, thereby the magnetic properties of the sintered magnet are improved. When the content of oxygen is large, there is a tendency that an oxide in the sintered compact prevents diffusion of the heavy rare earth element and the shell 6 is hard to be formed. An example of a method for reducing the content of oxygen in the sintered compact includes a method of keeping a raw material alloy under an atmosphere having a low oxygen concentration from hydrogen absorption grinding to sintering. It should be noted that, even if the content of oxygen in the sintered compact is outside the above range, production of the magnet of this embodiment is possible.

A content of a carbon element in the sintered compact is preferably 500 ppm or more and 1500 ppm or less, more preferably 700 ppm or more and 1200 ppm or less. When the content of carbon is smaller, amounts of impurities in the obtained sintered magnet becomes smaller, thereby the magnetic properties of the sintered magnet are improved. When the content of carbon is large, there is a tendency that an oxide in the sintered compact prevents diffusion of the heavy rare earth element and the shell 6 is hard to be formed. When the content of carbon is small, orientation becomes difficult at the time of molding in a magnetic field described below. Since the carbon element is added mainly by a lubricant agent at the time of molding, the carbon element can be controlled by its amount.

It is preferred that a Ga compound is further present in the grain boundary phase of the group of main phase grains 2. The Ga compound only has to be a compound containing Ga, and a specific example thereof includes $R_6Fe_{13}Ga$. When the grain boundary contains the Ga compound, a melting point of the grain boundary decreases, which promotes diffusion of the heavy rare earth compound when the heavy rare earth compound is diffused into the sintered compact.

The rare earth sintered magnet of this embodiment may further contain other elements such as Ni, Mn, Al, Cu, Nb, Ti, W, Mo, V, Ga, Zn, Si, O, and C as needed, and for example, can have a composition comprising, R: 29.0 to 33.0 mass %;
B: 0.85 to 0.98 mass %;
Al: 0.03 to 0.25 mass %;
Cu: 0.01 to 0.15 mass %;
Zr: 0.03 to 0.25 mass %;
Co: 3 mass % or less (note that not including 0 mass %);
Ga: 0 to 0.35 mass %;
O: 2500 ppm or less;
C: 500 ppm to 1500 ppm; and
Fe: the balance.

It is preferred that the residual magnetic flux density of the rare earth sintered magnet of the present invention is 1.35 or more. Moreover, it is preferred that the coercive force of the rare earth sintered magnet of the present invention is 1600 or more.

(Method for Producing a Rare Earth Sintered Magnet)

Figure 2:
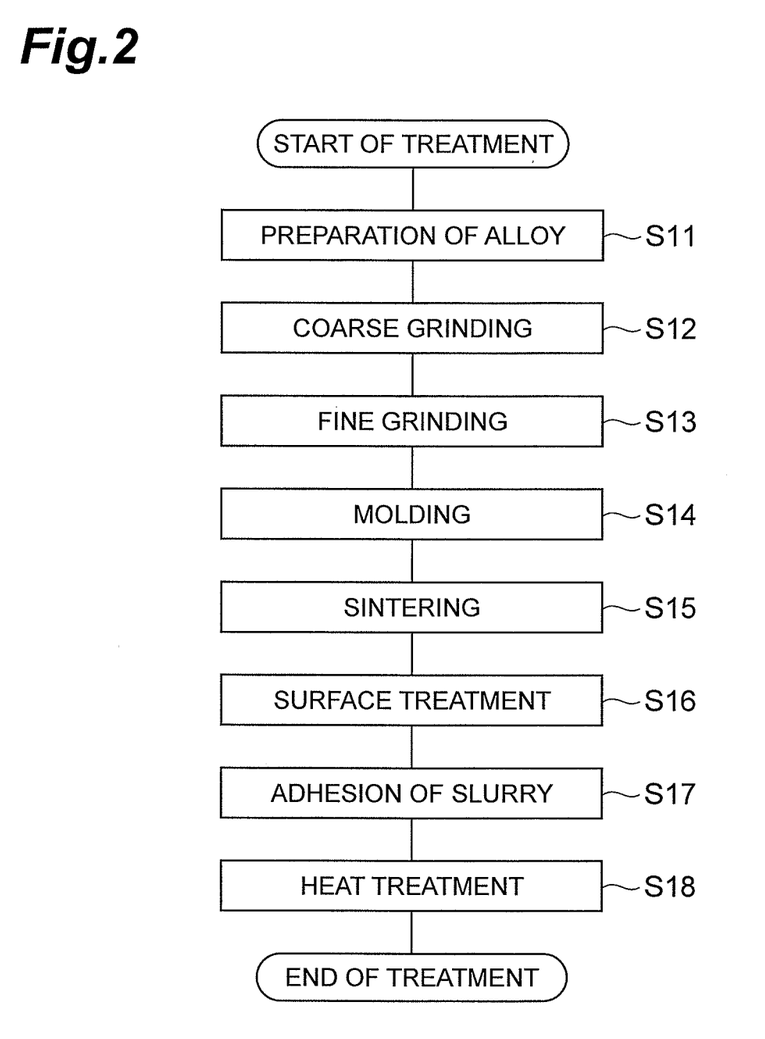
FIG. 2 is a flow diagram illustrating producing steps of a magnet according to one embodiment of the present invention.

FIG. 2 is a flow diagram illustrating producing steps of a magnet according to one embodiment of the present invention.

In production of the rare earth sintered magnet of this embodiment, at first, an alloy which will yield an R-T-B-based rare earth sintered magnet containing Zr and having a prescribed composition is prepared (step S11). In this step, for example, a simple substance, an alloy, a compound, or the like containing elements such as metals corresponding to the composition of the rare earth sintered magnet is melted in a vacuum or in an atmosphere of an inert gas such as argon, and then, by using this, an alloy having a prescribed composition is produced by carrying out an alloy production process such as a casting process or a strip casting process.

Depending on the number of the alloy used, there are a single alloy process in which the target alloy is produced by one type of alloy and a multi alloy process in which the target alloy is produced by a plurality of alloys. There are various types of multi alloy processes depending on designing of the composition of the alloy. A preferred example of the multi alloy process includes a process of using a main phase alloy containing $Nd_2Fe_{14}B$ mainly serving as the main phase and a grain boundary phase alloy containing R mainly serving as the grain boundary phase. In this case, when Zr is added by the grain boundary phase alloy, Zr easily segregates at around the grain boundary of the main phase, and then, the effect of suppressing diffusion of the heavy rare earth element into the main phase grain described above is easily obtained.

Next, the obtained alloy is subjected to coarse grinding to obtain grains having a grain diameter of about several hundred micro meters (step S12). For example, the coarse grinding of the alloy is carried out by using a coarse grinding machine such as a jaw crusher, a Brown mill, and a stamp mill, or by allowing the alloy to absorb hydrogen, and then, causing self-destructive grinding based on a difference in an amount of hydrogen absorption between different phases (hydrogen absorption grinding).

Next, a powder obtained by the coarse grinding is further subjected to fine grinding (step S13) to obtain a raw material powder of the rare earth sintered magnet (hereinafter, referred to as just as "raw material powder") having a grain diameter preferably of 1 to 10 more preferably of about 3 to 6 μm. The fine grinding is carried out by performing further grinding on the coarsely ground powder using a fine grinding machine such as a jet mill, a ball mill, a vibration mill, and a wet attritor with arbitrarily controlling conditions such as a grinding time.

In the case where a plurality of alloys is used, these alloys can be used by being mixed with each other. The mixing may be performed at any stage of before the coarse grinding, before the fine grinding, after the fine grinding.

Next, the raw material powder obtained as described above is molded into an intended shape (step S14). The molding is carried out with applying a magnetic field, thereby prescribed orientation is produced in the raw material powder. The molding can be carried out by, for example, a press molding. Specifically, the raw material powder is packed in a cavity of a mold, and then, the packed powder is pressed with being sandwiched between an upper punch and a lower punch, thereby it is possible to mold the raw material powder into a prescribed shape. The shape of the compact obtained by the molding is not particularly limited, and can be changed to a column shape, a plate shape, a ring shape, and the like, according to the shape of the intended magnet. It is preferred that the pressing during the molding is carried out at 50 to 200 MPa. Moreover, it is preferred that the applied magnetic field is 950 to 1600 kA/m. It is noted that, as a molding method, a wet molding method of molding slurry in which the raw material powder is dispersed in a solvent such as oil can be employed, other than the above descried dry molding method of molding the raw material powder directly.

Next, sintering is carried out by subjecting the compact to, for example, a heat treatment at 1010 to 1110° C. in a vacuum or in the presence of an inert gas for 2 to 6 hours (step S15). By this, the raw material powder undergoes liquid phase sintering, and a sintered compact (a sintered compact of the magnet) with an improved volume ratio of the main phase is obtained.

For the sintered compact, for example, it is preferred to carry out a surface treatment in which a surface of the sintered compact is treated by an acid solution after processing into an intended size and shape (step S16). As the acid solution used for the surface treatment, a mixed solution of an aqueous solution of nitric acid, hydrochloric acid, or the like and an alcohol is preferably used. This surface treatment can be carried out by, for example, immersing the sintered compact into the acid solution or by spraying the acid solution to the sintered compact.

By the aforementioned surface treatment, it is possible to remove pollution, an oxidized layer, or the like adhering to the sintered compact to obtain a clean surface, and then, adhesion and diffusion of the heavy rare earth compound described below are advantageously carried out. In view of carrying out removal of pollution, an oxidized layer, or the like more successfully, the surface treatment may be carried out with applying ultrasonic waves to the acid solution.

After that, a slurry containing a heavy rare earth compound containing the heavy rare earth element, a binder, and solvent is allowed to adhere to the surface of the sintered compact subjected to the surface treatment (step S17) (corresponding to the first step described above). As the heavy rare earth element contained in the heavy rare earth compound, Dy or Tb is preferred in view of obtaining a rare earth sintered magnet having high coercive force. Examples of the heavy rare earth compound include a hydride, an oxide, a halide, and a hydroxide of the heavy rare earth element. Among these heavy rare earth compounds, $DyH_2$, $DyF_3$ or $TbH_2$ is preferred. Especially, it is possible to prevent oxidation of the surface of the magnet because the binder is contained in the slurry.

It is preferred that the heavy rare earth compound is used as a powdery heavy rare earth powder. The heavy rare earth compound can be produced by subjecting a heavy rare earth compound produced by an conventional method or a heavy rare earth metal to a dry grinding process using a jet mill, a wet grinding process using a ball mill or the like after mixing with an organic solvent, or the like.

An average grain diameter of the heavy rare earth powder is preferably 100 nm to 50 μm, more preferably 1 μm to 5 μm. When the average grain diameter of the heavy rare earth compound is less than 100 nm, an amount of the heavy rare earth compound diffused in the sintered compact by the heat treatment becomes excessive, and then, there is a possibility that Br of the obtained rare earth sintered magnet becomes insufficient. On the other hand, when the average grain diameter of the heavy rare earth compound exceeds 50 μm, diffusion of the heavy rare earth compound into the sintered compact is hard to occur, and then, the effect of improving HcJ is sometimes not obtained sufficiently. Moreover, especially when the average grain diameter of the heavy rare earth compound is 5 μm or less, adhesion of the heavy rare earth compound to the sintered compact is advantageously carried out, and there is a tendency that a higher effect of improving HcJ is obtained.

Examples of the binder include an acrylic resin, a urethane resin, a butyral resin, a natural resin, and a cellulose resin.

As the solvent, one which can disperse the heavy rare earth compound uniformly without dissolving it is preferred, and preferred is an organic solvent. Specific examples thereof include an aldehyde, an alcohol, and a ketone. Moreover, an organic solvent having a specific permittivity of 10 or more at room temperature is more preferred. Since the organic solvent having a specific permittivity of 10 or more has satisfactory wettability with the heavy rare earth powder, it is possible to keep the dispersibility of the heavy rare earth powder at a higher level by using such an organic solvent. Furthermore, it is possible to mix these organic solvents with each other and use them.

An example of a method of allowing the slurry to adhere to the sintered compact includes a coating method, and specific examples thereof include a method of immersing the sintered compact into the slurry, a method of putting the sintered compact into the slurry and stirring them with a prescribed medium, and a method of putting the slurry by drops onto the sintered compact.

A content of the heavy rare earth compound in the slurry is preferably 10 to 60 mass %, more preferably 40 to 50 mass %. When the content of the heavy rare earth compound in the slurry is too small or too large, it tends to be difficult for the heavy rare earth compound to adhere to the sintered compact uniformly, and there is a possibility that a sufficient squareness ratio is hard to be obtained. Moreover, when the content is too large, the surface of the sintered compact becomes rough, and then, it sometimes becomes difficult to form plating and the like for the purpose of improving corrosion resistance of the obtained magnet.

A content of the binder in the slurry is preferably 0.5 to 15 mass % with respect to the weight of the heavy rare earth compound. When the content of the binder is too small, antioxidation effect of the magnet surface tends to decrease, and when the content of the binder is too large, the magnetic properties of the sintered compact decrease in comparison with the case where the content is within the above range.

It is noted that the slurry may further contain other components as needed. An example of the other components which may be contained in the slurry includes a dispersing agent for preventing agglomeration of the grains of the heavy rare earth compound.

While the heavy rare earth compound (the slurry) adheres to the sintered compact by the aforementioned method, especially in view of obtaining a satisfactory effect of improving the magnetic properties, it is preferred that the amount of the heavy rare earth compound adhering is in a constant range. Specifically, the amount of the heavy rare earth compound adhering (deposit efficiency; %) with respect to the mass of the rare earth sintered magnet (total mass of the sintered compact and the heavy rare earth compound) is preferably 0.1 to 3 mass %, more preferably 0.1 to 2 mass %, still more preferably 0.2 to 1 mass %.

Next, a heat treatment is performed on the sintered compact with the heavy rare earth compound adhering thereto (step S18) (corresponding to the second step described above). By this, the heavy rare earth compound adhering to the surface of the sintered compact diffuses into the sintered compact. The heat treatment can be performed by, for example, steps of two stages. In this case, it is preferred to perform the heat treatment at about 800 to 1000° C. for 10 minutes to 10 hours in the first stage, and then, perform the heat treatment at about 500 to 600° C. for 1 to 4 hours in the second stage. In such a heat treatment by two stages, for example, in the first stage, mainly diffusion of the heavy rare earth compound occurs, and in the second stage, the heat treatment is a so-called aging treatment, which contributes to improvement in the magnetic properties (especially HcJ). It is noted that the heat treatment is not necessarily performed by two stages, and may be performed so that at least diffusion of the heavy rare earth compound occurs.

Diffusion of the heavy rare earth compound occurs from the surface to the inside of the sintered compact by the heat treatment, and at this time, it is believed that the heavy rare earth compound diffuses mainly along the boundary of the main phase grains constituting the sintered compact and the grain boundary phase. As a result, in the obtained magnet, the heavy rare earth element deriving from the heavy rare earth compound locates unevenly in fringe region of the main phase grain or the grain boundary phase.

After that, the sintered compact with the heavy rare earth compound diffusing therein is cut into an intended size or subjected to a surface treatment as needed, and then, the objective rare earth sintered magnet is obtained. It is noted that the obtained rare earth sintered magnet may further comprise a protective layer such as a plated layer, an oxidation layer, and a resin layer on its surface for the purpose of suppressing deterioration.

(Motor)

Figure 3:
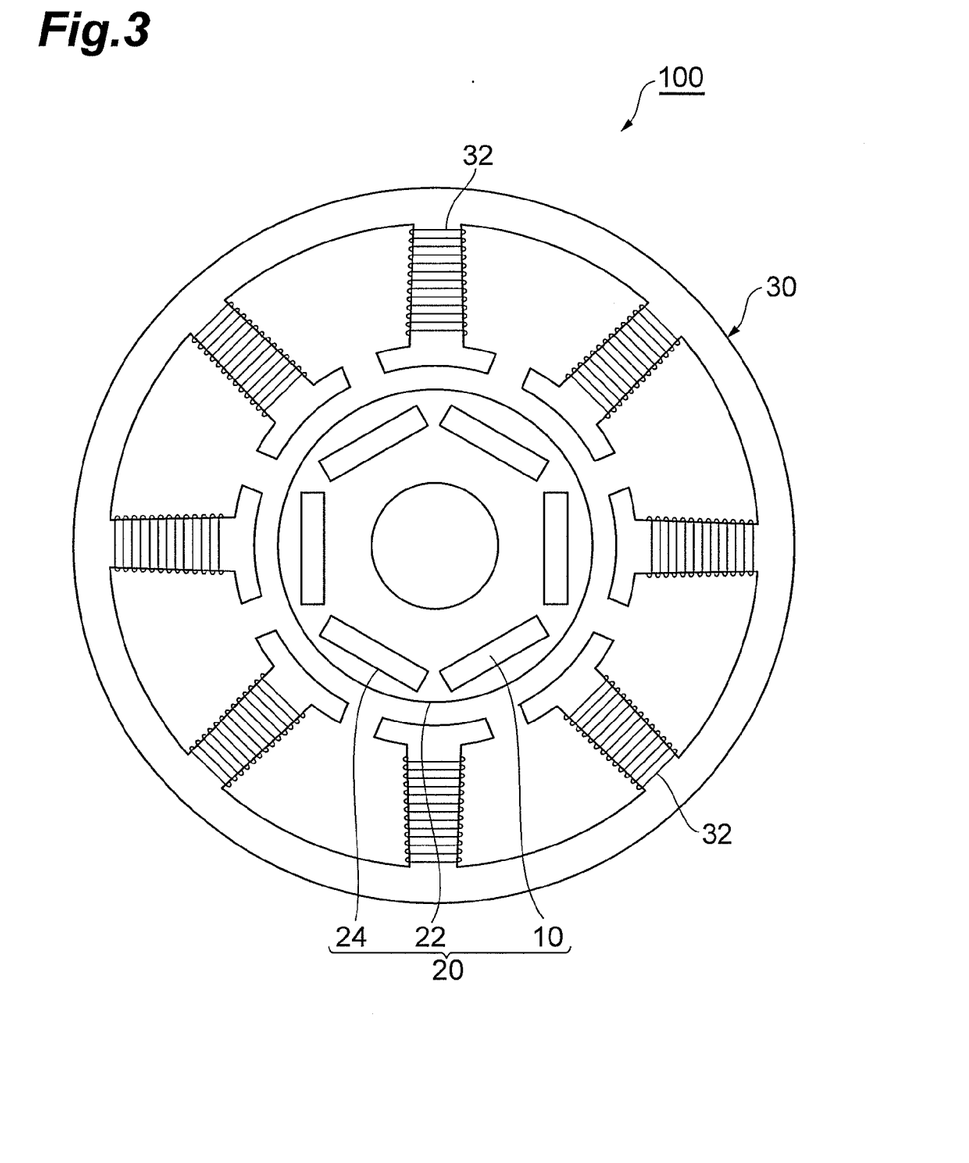
FIG. 3 is a diagram illustrating an internal structure of a motor according to one embodiment of the present invention.

FIG. 3 is an explanatory diagram illustrating an example of an internal structure of a motor according to this embodiment. A motor 100 of this embodiment is a permanent magnet synchronous motor (IPM motor), and comprises a cylindrically-shaped rotor 20 and a stator 30 arranged on the outside of the rotor 20. The rotor 20 comprises a cylindrically-shaped rotor core 22, a plurality of magnet containers 24 which are arranged along the outer periphery of the cylindrically-shaped rotor core 22 at prescribed intervals and provide accommodation for rare earth sintered magnets 10, and a plurality of rare earth sintered magnets 10 housed in the magnet containers 24.

The rare earth sintered magnets 10 which are adjacent to each other along the circumferential direction of the rotor 20 are housed in the magnet containers 24 so that the positions of N pole and S pole are opposite to each other. By this, the rare earth sintered magnets 10 which are adjacent to each other along the circumferential direction generate magnetic field lines of opposite direction to each other along the radical direction of the rotor 20.

The stator 30 comprises a plurality of coil portions 32 arranged along the outer periphery of the rotor 20 at prescribed intervals. The coil portions 32 and the rare earth sintered magnets 10 are arranged so as to face with each other. The stator 30 provides torque to the rotor 20 by an electromagnetic effect, and the rotor 20 rotates in the circumferential direction.

The IPM motor 100 comprises the rare earth sintered magnet 10 according to the aforementioned embodiment of the present invention in the rotor 20. The rare earth sintered magnet 10 has excellent magnetic properties, and at the same time, has a plated membrane which is not easily peeled off. Therefore, the IPM motor 100 is excellent in reliability. The IPM motor 100 can keep a high out put power for a longer time in comparison with the conventional techniques. The IPM motor 100 can be produced by a conventional method using conventional motor parts other than the rare earth sintered magnet 10.

In the case of the permanent magnet synchronous motor, the motor of the present invention is not limited to the IPM motor, and may be a SPM motor. Moreover, other than the permanent magnet synchronous motor, the motor of the present invention may be a permanent magnet direct-current motor, a liner synchronous motor, a voice coil motor, or a vibration motor.

(Automobile)

Figure 4:
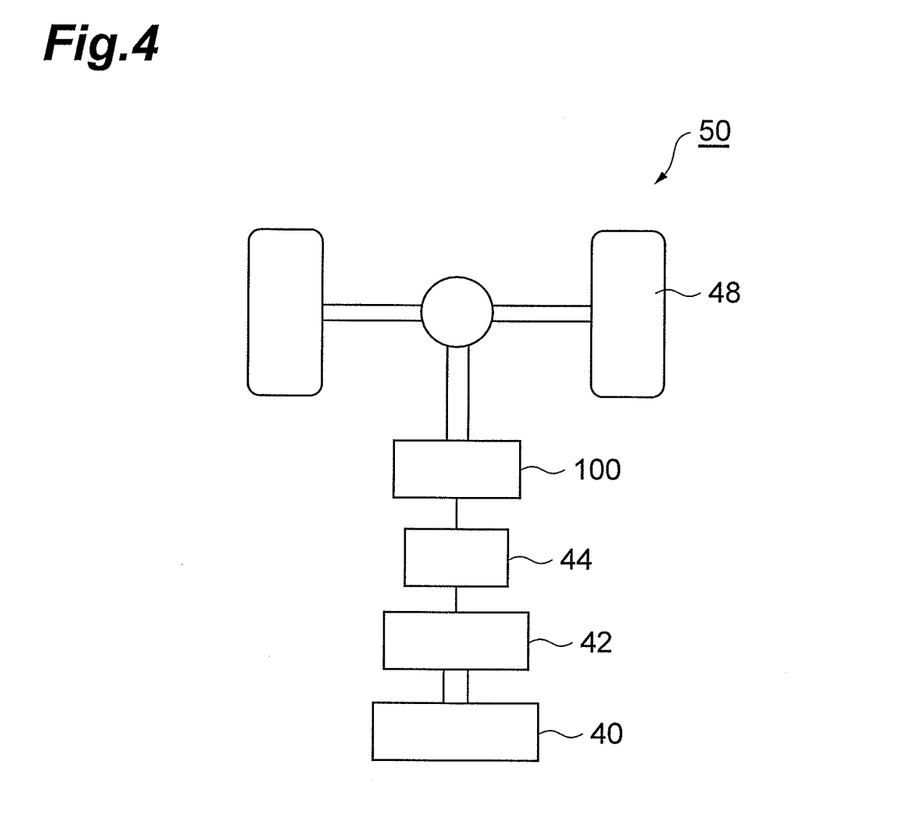
FIG. 4 is a conceptual diagram of an automobile according to one embodiment of the present invention.

FIG. 4 is a conceptual diagram illustrating electric generating mechanism, electric accumulating mechanism, and drive mechanism of an automobile according to this embodiment. It is noted that the structure of the automobile of this embodiment is not limited to that illustrated in FIG. 4. As shown in FIG. 4, the automobile 50 of this embodiment comprises the aforementioned motor 100 of this embodiment, a wheel 48, an electric accumulator 44, an electric generator 42, and an engine 40.

Mechanical energy generated by the engine 40 is converted into electric energy by the electric generator 42. The electric energy is accumulated in the electric accumulator 44. The accumulated electric energy is converted into mechanical energy by the motor 100. By the mechanical energy from the motor 100, the wheel 48 rotates, and the automobile 50 is driven.

EXAMPLES

Example 1

At first, raw material metals of the rare earth sintered magnet were prepared, and then, a raw material alloy was produced by a strip casting method using these metals so as to have a composition (composition: 29 wt % Nd-2 wt % Dy-0.5 wt % Co-0.2 wt % Al-0.07 wt % Cu-0.2 wt % Zr-0.95 wt % B-bal.Fe) shown in Table 1. Next, after the obtained alloy was allowed to absorb hydrogen, hydrogen grinding treatment was carried out by dehydrogenation at 600° C. for 1 hour in an Ar atmosphere.

Next, the powder after hydrogen grinding was further subjected to fine grinding, thus obtaining a raw material powder having an average grain diameter (D50) of 40 μm (crystal grain diameter: 4.2 μm).

This raw material powder was packed in a mold arranged in an electric magnet and molded in a magnetic field to produce a compact. The molding was carried out by applying a pressure of 120 MPa to the raw material powder with applying a magnetic field of 1200 kA/m to the raw material powder.

The compact was then sintered at 1050° C. for 4 hours in a vacuum and rapidly cooled to obtain a sintered compact. It is noted that each of the steps from the hydrogen grinding treatment to sintering were carried out in an atmosphere with an oxygen concentration of less than 100 ppm.

The sintered compact was processed into 5 mm (magnetic anisotropic direction)×15 mm×10 mm. The sintered compact after processing was subjected to a two-stage heat treatment to obtain a base material 1. In the heat treatment of the first stage, the sintered compact was heated at 900° C. for 6 hours in an Ar atmosphere. In the heat treatment of the second stage, the sintered compact was heated at 540° C. for 2 hours in an Ar atmosphere.

Furthermore, other than the base material 1, the above sintered compact after processing was coated with a slurry containing $DyH_2$, a binder, and a polar solvent on its entire surface by a dip method, and then, subjected to the same two-stage heat treatment, thus producing a rare earth sintered magnet of Example 1. It is noted that the application was carried out so that the total amount of $DyH_2$ and the binder was 5 mg/cm² with respect to a coated area.

Examples 2 to 11 and Comparative Examples 1 to 12

Rare earth sintered magnets of Examples 2 to 11 and Comparative Examples 1 to 12 were produced by the same process as that in Example 1 except that the compositions and the crystal grain diameters of the rare earth sintered magnets were changed as shown in Tables 1 to 3.

Example 12

At first, raw material metals of the rare earth sintered magnet were prepared, and then, raw material alloys were produced by a strip casting method using these metals so as to obtain a main phase alloy 12A (composition: 30.5 wt % Nd-0.2 wt % Al-0.21 wt % Zr-1.00 wt % B-bal.Fe) and a grain boundary phase alloy 12B (composition: 40 wt % Dy-10 wt % Co-0.2 wt % Al-1.4 wt % Cu-bal. Fe). Next, the obtained alloys were mixed at a weight ratio of 12A:12B=95:5, and then, a magnet was produced by the same process as that in Example 1. The composition of the alloy after mixing was 29 wt % Nd-2.0 wt % Dy-0.5 wt % Co-0.2 wt % Al-0.07 wt % Cu-0.2 wt % Zr-0.95 wt % B-bal. Fe.

Example 13

At first, raw material metals of the rare earth sintered magnet were prepared, and then, raw material alloys were produced by a strip casting method using these metals so as to obtain a main phase alloy 13A (composition: 30.5 wt % Nd-0.2 wt % Al-1.00 wt % B-bal. Fe) and a grain boundary phase alloy 13B (composition: 40 wt % Dy-10 wt % Co-0.2 wt % Al-1.4 wt % Cu-4.0 wt % Zr-bal. Fe). Next, the obtained alloys were mixed at a weight ratio of 13A:13B=95:5, and then, a magnet was produced by the same process as that in Example 1. The composition of the alloy after mixing was 29 wt % Nd-2 wt % Dy-0.5 wt % Co-0.2 wt % Al-0.07 wt % Cu-0.2 wt % Zr-0.95 wt % B-bal. Fe.

[Evaluation of Properties of Base Material and Rare Earth Sintered Magnet]

Properties of the base materials and the rare earth sintered magnets obtained in Examples and Comparative Examples were measured by the following method. The results are shown in Tables 1 to 3.

(Residual Magnetic Flux Density and Coercive Force)

Magnetic properties of test samples obtained by using the base materials and the rare earth sintered magnets obtained in Examples and Comparative Examples were measured using a B—H tracer. By the obtained results, each of the residual magnetic flux density (Br), the coercive force (HcJ), and the squareness ratio (Hk/HcJ) of the each test sample were obtained.

(Measurement of Contents of Nitrogen and Oxygen in Sintered Compact)

Measurement of the content of oxygen and the content of nitrogen was carried out by an oxygen and nitrogen-in-metal analyzer.

Specifically, the sample was gasified in a graphite crucible (oxygen became CO and nitrogen became $N_2$), and CO was detected by a non-dispersive infrared detector and $N_2$ was detected by a thermal conductivity detector.

(Measurement of Content of Carbon in Sintered Compact)

Measurement of the content of carbon was carried out by a carbon-in-metal analyzer. Specifically, the sample was gasified (CO, $CO_2$) in a high-frequency induction heating furnace, and detected by a non-dispersive infrared detector.

(Measurement of Content of Ga, Total Content of Rare Earth Elements (TRE) in Sintered Compact)

Analysis of composition was carried out by fluorescent X-rays.

(Measurement of Content of B in Sintered Compact)

Analysis of the content of B was carried out by ICP-AES.

(Line Analysis Using STEM-EDS)

Figure 5:
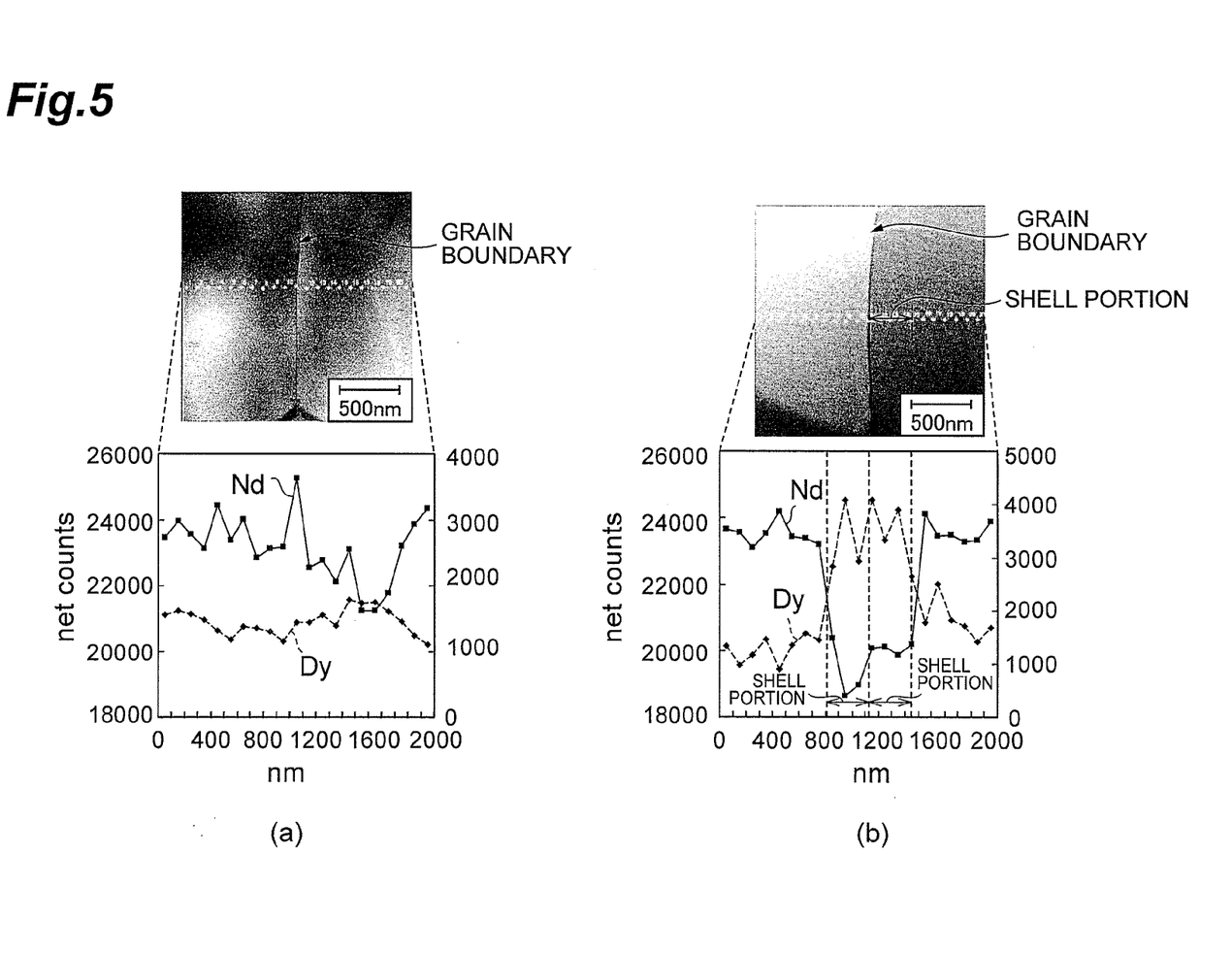

For the base material and the rare earth sintered magnet obtained in Example, line analysis was performed by an energy dispersive X-ray spectroscope provided in a scanning transmission electron microscope (STEM-EDS). FIG. 5 (a) is a diagram illustrating the result for the base material and FIG. 5 (b) is a diagram illustrating the result for the rare earth sintered magnet.

As is apparent from FIG. 5 (a), for the base material, while the concentration of Nd drastically increases at around the grain boundary phase, there exists no portion in which the ratio of the heavy rare earth element (Dy) to the light rare earth element (Nd), (Dy/Nd) is twice or more as large as that in the center portion of the main phase grain (core) at a portion near the grain boundary phase of the main phase grain, which indicates that the shell portion does not exist. On the other hand, as is apparent from FIG. 5 (b), for the rare earth sintered magnet, the concentration of Nd drastically increases at around the grain boundary phase, and there exists a portion in which Dy/Nd is twice or more as large as that in the center portion of the main phase grain at a portion near the grain boundary phase of the main phase grain, which indicates that the shell portion exists. It is noted that, in FIG. 5 (b), a portion represented by a double-headed arrow corresponds to the shell portion.

(Measurement of Thickness of Shell)

Line analysis was performed on 5 points around the center portion of the main phase grain and on a portion near the grain boundary by using an STEM-EDS. An average value of an intensity ratio obtained from analysis of the heavy rare earth element and the light rare earth element at 5 points around the center portion was compared with a value of an intensity ratio of each point obtained from line analysis at the portion near the grain boundary, and a portion having a value which is twice or more as large as the average value of the center portion was taken as the shell portion, and the thickness was measured. It is noted that the average value of the intensity ratio at around the center portion of the main phase grain was 0.06.

(Measurement of the Number of Zr Precipitates)

For the base materials obtained in Examples, the number of Zr precipitates [piece] located within 1 μm from the grain boundary of the main phase grain in a cross section was measured by using a STEM-EDS. The value in the Table is an average value of Zr precipitates for 5 main phase grains.

TABLE 1

Basic composition: 29 wt % Nd—2.0 wt % Dy—0.5 wt % Co—0.2 wt % Al—0.07 wt % Cu—0.95 wt % B—bal. Fe
TRE = 31 wt %, Crystal grain diameter = 4.2 μm, B = 0.95 wt %, Ga = 0 wt %
Composition after diffusion: 28.9 wt % Nd—2.45 wt % Dy—0.5 wt % Co—0.2 wt % Al—0.07 wt % Cu—0-0.6 wt % Zr—0.95 wt % B—bal. Fe

| | | Content of Zr [wt %] | Content of oxygen [ppm] | Content of carbon [ppm] | Br [T] | HcJ [kA/m] | Hk/HcJ | ΔHcJ | ΔHk/HcJ | ΔBr | Thickness of shell (nm) | Number of Zr precipitates [piece] |
|---|---|---|---|---|---|---|---|---|---|---|---|---|
| Example 1 | Base material | 0.2 | 500 | 1000 | 1.37 | 1353 | 98 | — | — | — | — | 3 |
| | Rare earth magnet | — | — | — | 1.36 | 1751 | 96 | 398 | −2 | −0.01 | 390 | — |
| Example 2 | Base material | 0.2 | 1800 | 1000 | 1.37 | 1313 | 98 | — | — | — | — | 2 |
| | Rare earth magnet | — | — | — | 1.36 | 1672 | 96 | 358 | −2 | −0.01 | 420 | — |
| Example 3 | Base material | 0.4 | 500 | 1000 | 1.36 | 1433 | 98 | — | — | — | — | 5 |
| | Rare earth magnet | — | — | — | 1.35 | 1831 | 96 | 398 | −2 | −0.01 | 380 | — |
| Example 10 | Base material | 0.07 | 500 | 1000 | 1.38 | 1313 | 98 | — | — | — | — | 1 |
| | Rare earth magnet | — | — | — | 1.37 | 1671 | 96 | 358 | −2 | −0.01 | 430 | — |
| Comparative Example 1 | Base material | 0 | 500 | 1000 | 1.37 | 1114 | 85 | — | — | — | — | 0 |
| | Rare earth magnet | — | — | — | 1.35 | 1353 | 81 | 239 | −4 | −0.02 | 550 | — |
| Comparative Example 2 | Base material | 0 | 1800 | 1000 | 1.36 | 1194 | 90 | — | — | — | — | 0 |
| | Rare earth magnet | — | — | — | 1.34 | 1393 | 85.5 | 199 | −4.5 | −0.02 | 600 | — |
| Comparative Example 3 | Base material | 0 | 4500 | 1000 | 1.35 | 1194 | 98 | — | — | — | — | 0 |
| | Rare earth magnet | — | — | — | 1.33 | 1313 | 93 | 199 | −5 | −0.02 | 740 | — |
| Comparative Example 4 | Base material | 0.6 | 500 | 1000 | 1.33 | 1473 | 98 | — | — | — | — | 7 |
| | Rare earth magnet | — | — | — | 1.32 | 1592 | 94 | 199 | −4 | −0.01 | 510 | — |
| Comparative Example 5 | Base material | 0.2 | 4500 | 1000 | 1.35 | 1194 | 98 | — | — | — | — | 3 |
| | Rare earth magnet | — | — | — | 1.34 | 1313 | 93 | 199 | −5 | −0.01 | 570 | — |
| Comparative Example 6 | Base material | 0.2 | 500 | 1800 | 1.36 | 1234 | 98 | — | — | — | — | 2 |
| | Rare earth magnet | — | — | — | 1.35 | 1393 | 93 | 159 | −5 | −0.01 | 550 | — |
| Example 12 | Base material | 0.2 | 500 | 1000 | 1.37 | 1353 | 98 | — | — | — | — | 1 |
| | Rare earth magnet | — | — | — | 1.35 | 1672 | 95 | 319 | −3 | −0.02 | 480 | — |
| Example 13 | Base material | 0.2 | 500 | 1000 | 1.37 | 1353 | 98 | — | — | — | — | 5 |
| | Rare earth magnet | — | — | — | 1.36 | 1790 | 96 | 437 | −2 | −0.01 | 350 | — |

TABLE 2

Basic composition: ? wt % Nd—2.0 wt % Dy—0.5 wt % Co—0.2 wt %
Al—0.07 wt % Cu—0.2 wt % Zr—? wt % B—bal. Fe
Content of carbon = 1000 ppm, Ga = 0 wt %
Composition after diffusion: (x − 0.1)wt % Nd—2.45 wt % Dy—0.5 wt % Co—0.2 wt %
Al—0.07 wt % Cu—0.2 wt % Zr—y wt % B—bal. Fe

| | | Nd content [wt %] | TRE content* [wt %] | B content [wt %] | Grain diameter of raw material powder D50 [μm] | Crystal grain diameter [μm] | Content of oxygen [ppm] | Br [T] | HcJ [kA/m] |
|---|---|---|---|---|---|---|---|---|---|
| Example 4 | Base material | 29 | 31 | 0.93 | 3.4 | 3.6 | 1000 | 1.37 | 1393 |
| | Rare earth magnet | — | — | — | — | — | — | 1.36 | 1751 |
| Comparative Example 7 | Base material | 26 | 28 | 0.93 | 3.4 | 3.6 | 1000 | 1.39 | 1313 |
| | Rare earth magnet | — | — | — | — | — | — | 1.38 | 1512 |
| Comparative Example 8 | Base material | 32 | 34 | 0.93 | 3.4 | 3.6 | 1000 | 1.33 | 1433 |
| | Rare earth magnet | — | — | — | — | — | — | 1.32 | 1791 |
| Example 5 | Base material | 30 | 32 | 0.9 | 3.9 | 4.1 | 700 | 1.36 | 1393 |
| | Rare earth magnet | — | — | — | — | — | — | 1.35 | 1831 |
| Comparative Example 9 | Base material | 30 | 32 | 0.83 | 3.9 | 4.1 | 700 | 1.35 | 1075 |
| | Rare earth magnet | — | — | — | — | — | — | 1.34 | 1393 |
| Comparative Example 10 | Base material | 30 | 32 | 1.02 | 3.9 | 4.1 | 700 | 1.36 | 1313 |
| | Rare earth magnet | — | — | — | — | — | — | 1.35 | 1552 |
| Example 6 | Base material | 28 | 30 | 0.9 | 5.5 | 5.7 | 500 | 1.38 | 1313 |
| | Rare earth magnet | — | — | — | — | — | — | 1.37 | 1711 |
| Comparative Example 11 | Base material | 28 | 30 | 0.9 | 2.3 | 2.5 | 2500 | 1.37 | 1473 |
| | Rare earth magnet | — | — | — | — | — | — | 1.36 | 1592 |
| Comparative Example 12 | Base material | 28 | 30 | 0.9 | 6.6 | 6.9 | 450 | 1.37 | 1114 |
| | Rare earth magnet | — | — | — | — | — | — | 1.36 | 1433 |

| | | Hk/HcJ | ΔHcJ | ΔHk/HcJ | ΔBr | Thickness of shell (nm) | Number of Zr precipitates [piece] |
|---|---|---|---|---|---|---|---|
| Example 4 | Base material | 98 | — | — | — | — | 2 |
| | Rare earth magnet | 96 | 358 | −2 | −0.01 | 390 | — |
| Comparative Example 7 | Base material | 98 | — | — | — | — | 2 |
| | Rare earth magnet | 95 | 199 | −3 | −0.01 | 600 | — |
| Comparative Example 8 | Base material | 97 | — | — | — | — | 2 |
| | Rare earth magnet | 94 | 358 | −3 | −0.01 | 520 | — |
| Example 5 | Base material | 98 | — | — | — | — | 2 |
| | Rare earth magnet | 96 | 438 | −2 | −0.01 | 460 | — |
| Comparative Example 9 | Base material | 96 | — | — | — | — | 1 |
| | Rare earth magnet | 94 | 318 | −2 | −0.01 | 700 | — |
| Comparative Example 10 | Base material | 98 | — | — | — | — | 2 |
| | Rare earth magnet | 96 | 239 | −4 | −0.01 | 670 | — |
| Example 6 | Base material | 98 | — | — | — | — | 2 |
| | Rare earth magnet | 96 | 398 | −2 | −0.01 | 480 | — |
| Comparative Example 11 | Base material | 97 | — | — | — | — | 3 |
| | Rare earth magnet | 93 | 119 | −4 | −0.01 | 650 | — |
| Comparative Example 12 | Base material | 98 | — | — | — | — | 2 |
| | Rare earth magnet | 96 | 318 | −2 | −0.01 | 710 | — |

TRE content means the total content of rare earth elements

TABLE 3

Basic composition: 29 wt % Nd—2.0 wt % Dy—0.5 wt % Co—0.2 wt %
Al—0.07 wt % Cu—0.2 wt % Zr—0.9 wt % B—bal. Fe
TRE = 31 wt %, Content of oxygen = 500 ppm, Content of carbon = 1000 ppm, Crystal grain diameter = 4.2 μm
Composition after diffusion: 28.9 wt % Nd—2.45 wt % Dy—0.5 wt % Co—0.2 wt %
Al—0.07 wt % Cu—0.2 wt % Zr—0.9 wt % B—bal. Fe

| | | Content of Ga [wt %] | Br [T] | HcJ [kA/m] | Hk/HcJ | ΔHcJ | ΔHk/HcJ | ΔBr | Thickness of shell (nm) | Number of Zr precipitates [piece] |
|---|---|---|---|---|---|---|---|---|---|---|
| Example 7 | Base material | 0 | 1.37 | 1353 | 98 | — | — | — | — | 3 |
| | Rare earth magnet | — | 1.36 | 1751 | 96 | 398 | −2 | −0.01 | 380 | — |
| Example 11 | Base material | 0.05 | 1.37 | 1377 | 98 | — | — | — | — | 3 |
| | Rare earth magnet | — | 1.36 | 1790 | 97 | 413 | −1 | −0.01 | 350 | — |
| Example 8 | Base material | 0.12 | 1.37 | 1393 | 98 | — | — | — | — | 3 |
| | Rare earth magnet | — | 1.36 | 1831 | 97 | 438 | −1 | −0.01 | 330 | — |
| Example 9 | Base material | 0.3 | 1.36 | 1473 | 98 | — | — | — | — | 3 |
| | Rare earth magnet | — | 1.35 | 1950 | 97 | 478 | −1 | −0.01 | 340 | — |

As is apparent from Tables 1 to 3, the rare earth sintered magnets of Examples 1 to 13 are excellent in residual magnetic flux density and coercive force. On the other hand, the rare earth sintered magnets of Comparative Examples 1 to 12 is inferior in at least one of residual magnetic flux density and coercive force.

REFERENCE SIGNS LIST

2 . . . main phase grain, 4 . . . core, 6 . . . shell, 7 . . . grain boundary phase, 8 . . . Zr compound, 10 . . . rare earth sintered magnet, 20 . . . rotor, 22 . . . rotor core, 30 . . . stator, 32 . . . coil portion, 40 . . . engine, 42 . . . electric generator, 44 . . . electric accumulator, 48 . . . wheel, 50 . . . automobile, 100 . . . IPM motor.

The invention claimed is:

1. A rare earth sintered magnet comprising a group of main phase grains each composed of an R-T-B-based rare earth magnet comprising a core and a shell covering the core,
wherein a thickness of the shell is 500 nm or less,
R includes a light rare earth element and a heavy rare earth element, and
a Zr compound is present in the shell.

2. The rare earth sintered magnet according to claim 1, wherein a Ga compound is further present in the grain boundary phase of the group of main phase grains.

3. The rare earth sintered magnet according to claim 1, wherein a content of an oxygen element is 2500 ppm or less and a content of a carbon element is 500 ppm or more and 1500 ppm or less in the rare earth sintered magnet.

4. The rare earth sintered magnet according to claim 1, wherein a content of a B element is 0.85 mass % or more and 0.98 mass % or less in the rare earth sintered magnet.

5. The rare earth sintered magnet according to claim 1, wherein a total content of the rare earth element R is 29.0 mass % or more and 33.0 mass % or less in the rare earth sintered magnet.

6. The rare earth sintered magnet according to claim 1, wherein a content of a Zr element is 0.05 mass % or more and 0.5 mass % or less in the rare earth sintered magnet.

7. A motor comprising the rare earth sintered magnet according to claim 1.

8. An automobile comprising the motor according to claim 7.

9. The rare earth sintered magnet according to claim 1, wherein the Zr compound is present in a grain boundary phase of the group of main phase grains.

10. The rare earth sintered magnet according to claim 1, wherein
the thickness of the shell is 30 nm or higher and 500 nm or less.

* * * * *